United States Patent
Lugg et al.

(10) Patent No.: US 11,126,782 B2
(45) Date of Patent: Sep. 21, 2021

(54) APPLYING RETICLE ENHANCEMENT TECHNIQUE RECIPES BASED ON FAILURE MODES PREDICTED BY AN ARTIFICIAL NEURAL NETWORK

(71) Applicant: Synopsys, Inc., Mountain View, CA (US)

(72) Inventors: Robert M. Lugg, Hillsboro, OR (US); Jay A. Hiserote, Hillsboro, OR (US)

(73) Assignee: Synopsys, Inc., Mountain View, CA (US)

(*) Notice: Subject to any disclaimer, the term of this patent is extended or adjusted under 35 U.S.C. 154(b) by 0 days.

(21) Appl. No.: 16/989,631

(22) Filed: Aug. 10, 2020

(65) Prior Publication Data

US 2021/0048741 A1  Feb. 18, 2021

Related U.S. Application Data

(60) Provisional application No. 62/887,728, filed on Aug. 16, 2019.

(51) Int. Cl.
 *G06F 30/30* (2020.01)
 *G06N 20/00* (2019.01)
 (Continued)

(52) U.S. Cl.
 CPC ............. *G06F 30/398* (2020.01); *G03F 1/36* (2013.01); *G03F 7/70441* (2013.01);
 (Continued)

(58) Field of Classification Search
 CPC .... G06F 30/27; G06F 30/398; G06F 2119/02; G06F 2119/18; G06N 3/08; G06N 20/00; G03F 1/36; G03F 7/70441
 See application file for complete search history.

(56) References Cited

U.S. PATENT DOCUMENTS 9,519,732 B1 * 12/2016 Gennari ................ G06F 30/398
10,706,205 B2 * 7/2020 Shao ........................ G03F 7/705
(Continued)

FOREIGN PATENT DOCUMENTS

WO  2019048506 A1  3/2019

OTHER PUBLICATIONS

Choi, Suhyeong, "Neural Network Classifier-Based OPC With Imbalanced Training Data", vol. 38 No. 5, May 1, 2019, IEEE Trans. on Computer-Aided Design of Integrated Circuits and Systems, pp. 938-948.
(Continued)

*Primary Examiner* — Leigh M Garbowski
(74) *Attorney, Agent, or Firm* — Park, Vaughan, Fleming & Dowler LLP; Laxman Sahasrabuddhe (57) ABSTRACT

Training data may be collected for each design intent in a set of design intents by identifying a set of failures that is expected to occur when the design intent is manufactured, and recording a failure mode and a location of each failure in the set of failures. Next, the training data may be used to train a machine learning model, e.g., an artificial neural network, to predict failure modes and locations of failures. The trained machine learning model, e.g., trained artificial neural network, can then be used to predict a set of failures for a given design intent. Next, for each predicted failure, a reticle enhancement technique (RET) recipe may be selected based on the failure mode of the failure, and the selected RET recipe may be applied to an area around the location of the failure.

20 Claims, 5 Drawing Sheets

(51) Int. Cl.
| | |
|---|---|
| *G06F 30/398* | (2020.01) |
| *G06F 30/27* | (2020.01) |
| *G03F 1/36* | (2012.01) |
| *G03F 7/20* | (2006.01) |
| *G06F 119/18* | (2020.01) |
| *G06F 119/02* | (2020.01) |
| *G06N 3/08* | (2006.01) |

(52) U.S. Cl.
CPC ............ *G06F 30/27* (2020.01); *G06N 20/00* (2019.01); *G06F 2119/02* (2020.01); *G06F 2119/18* (2020.01); *G06N 3/08* (2013.01)

(56) References Cited

U.S. PATENT DOCUMENTS

2020/0356011 A1* 11/2020 Su .......................... G03F 7/705
2020/0380362 A1* 12/2020 Cao ....................... G06N 20/00

OTHER PUBLICATIONS

Lin_Yibo, "Machine Learning for Mask/Wafer Hotspot Detection and Mask Synthesis", Proc. of SPIE ISSN 0277-786X vol. 10524, Oct. 16, 2017, 13 pages.

Yang_Haoyu, "GAN-OPC: Mask Optimization with Lithography-Guided Generative Adversarial Nets", Proc. of 55th Annual Design Automation Conf., Jun. 24, 2018, 7 pages.

* cited by examiner

APPLYING RETICLE ENHANCEMENT TECHNIQUE RECIPES BASED ON FAILURE MODES PREDICTED BY AN ARTIFICIAL NEURAL NETWORK

RELATED APPLICATION

This application claims benefit of U.S. Provisional Application Ser. No. 62/887,728, filed on 16 Aug. 2019, the contents of which are herein incorporated by reference in their entirety for all purposes.

TECHNICAL FIELD

The present disclosure generally relates to integrated circuit (IC) design. More specifically, the present disclosure relates to applying reticle enhancement technique (RET) recipes based on failure modes predicted by an artificial neural network.

BACKGROUND

Advances in process technology and an almost unlimited appetite for computing and storage have fueled a rapid increase in the size and complexity of IC designs. These advances can be attributed to the improvements in semiconductor design and manufacturing technologies which have made it possible to integrate tens of millions of devices onto a single chip.

SUMMARY

Some embodiments described herein feature methods and apparatuses that may collect training data for each design intent in a set of design intents by identifying a set of failures that is expected to occur when the design intent is manufactured, and recording a failure mode and location of each failure in the set of failures. In some embodiments, a design intent may specify shapes that are desired to be printed on a wafer, i.e., the design intent may not include any modifications that are performed using an RET. In some embodiments, training data may be collected by performing an iterative loop that includes: identifying a failure mode in a mask layout using lithographic verification, adjusting an RET recipe to resolve occurrences of the failure mode, and applying the adjusted RET recipe to the mask layout. Next, the embodiments may use the training data to train a machine learning model, e.g., an artificial neural network, to predict failure modes and locations of failures for a given design intent that is different from the design intents that were used during training.

In some embodiments, supervised learning may be used to train the artificial neural network, in which a design intent may be provided as input and failure modes and locations may be provided as a desired output.

In some embodiments, a separate design layer may be created for each failure mode to mark locations of failures belonging to the failure mode, and each location of a failure may be marked by placing a polygon in the design layer in proximity to the location of the failure. In these embodiments, the adjusted RET recipe may be applied to areas in a mask layout that are within polygons in the design layer corresponding to the failure mode.

Some embodiments may use the trained artificial neural network to predict failure modes and locations of failures that are expected to occur in a design intent. Next, for each predicted failure, the embodiments may select an RET recipe based on the failure mode of the failure, and apply the selected RET recipe to an area around the location of the failure.

BRIEF DESCRIPTION OF THE FIGURES

The disclosure can be understood based on the detailed description given below and the accompanying figures. The figures are for illustrative purposes, and do not limit the scope of the disclosure. Furthermore, the figures are not necessarily drawn to scale.

DETAILED DESCRIPTION

A semiconductor manufacturing technology may use multiple physical and/or chemical processes to transfer a design intent onto the wafer. In this disclosure, the term "design intent" refers to the shapes that are desired to be printed on the wafer, e.g., by using photolithography. The term "mask layout" refers to the shapes on the photolithography mask that is used in photolithography to print the design intent. Due to physical and/or chemical phenomenon that occur during semiconductor manufacturing, the design intent may not print as desired if the design intent is used as is, i.e., without any modifications, in the mask layout.

An RET recipe may be used to modify the design intent to obtain a modified mask layout which may then be used in photolithography. The modifications added by the RET recipe may compensate physical or chemical effects that cause the printed pattern to diverge from the design intent. Specifically, when a mask layout containing the modified mask layout is used in photolithography, the printed shapes on the wafer may be within an acceptable tolerance of the design intent.

Examples of RETs include, but are not limited to, rule-based RETs, process model based RETs, and inverse imaging based RETs (also known as inverse lithography technique or ILT). For each type of RET, different tradeoff points may exist between the amount of computational resources used (e.g., the amount of run time, memory, and/or compute power used by the RET) and the quality of results produced (e.g., the quality of results may correspond to the extent to which manufacturing problems are resolved). Specifically, if a higher quality of results are desired (e.g., if all manufacturing problems are desired to be eliminated), then a large amount of computational resources may be used (e.g., the run time to apply the RET may be long).

In this disclosure the term "RET recipe" may refer to an RET technique or a sequence of RET techniques, where each RET technique is set at a particular tradeoff point between the amount of computational resources used and the quality of results produced. The phrase "adjusting an RET recipe" may refer to changing the type of one or more RETs that are being used and/or changing the tradeoff point of one or more RETs between the amount of computational resources used and the quality of results produced.

Using an RET recipe that produces a very high quality of results to process the entire mask layout may use an impracticably large amount of computational resources. On the other hand, using an RET recipe that uses a low amount of computational resources for the entire mask layout can result in poor quality of results. Note that a single manufacturing problem may result in a complete failure of the IC chip. If it is not known which areas are susceptible to which types of manufacturing problems, a computationally costly RET technique may end up being used for the entire mask layout, which can significantly increase the amount of time spent on RET.

Embodiments described in this disclosure can use machine learning, e.g., an artificial neural network, to predict the types and locations of manufacturing problems that are expected to occur in a mask layout. Additionally, for each type of manufacturing problem, the embodiments may determine an appropriate RET recipe that is expected to resolve the manufacturing problem. Next, given a design intent, the embodiments may use the trained machine learning model, e.g., the trained artificial neural network, to predict the types and locations of manufacturing problems that are expected to occur in the design intent. For each type of predicted manufacturing problem, the embodiments can selectively apply an appropriate RET recipe (which was determined in advance) at the locations where the predicted manufacturing problem is expected to occur.

Advantages of embodiments disclosed herein include, but are not limited to, a process that can produce a high quality mask layout (e.g., an mask layout that is expected to have no manufacturing problems) without using a large amount of computational resources.

Figure 1:
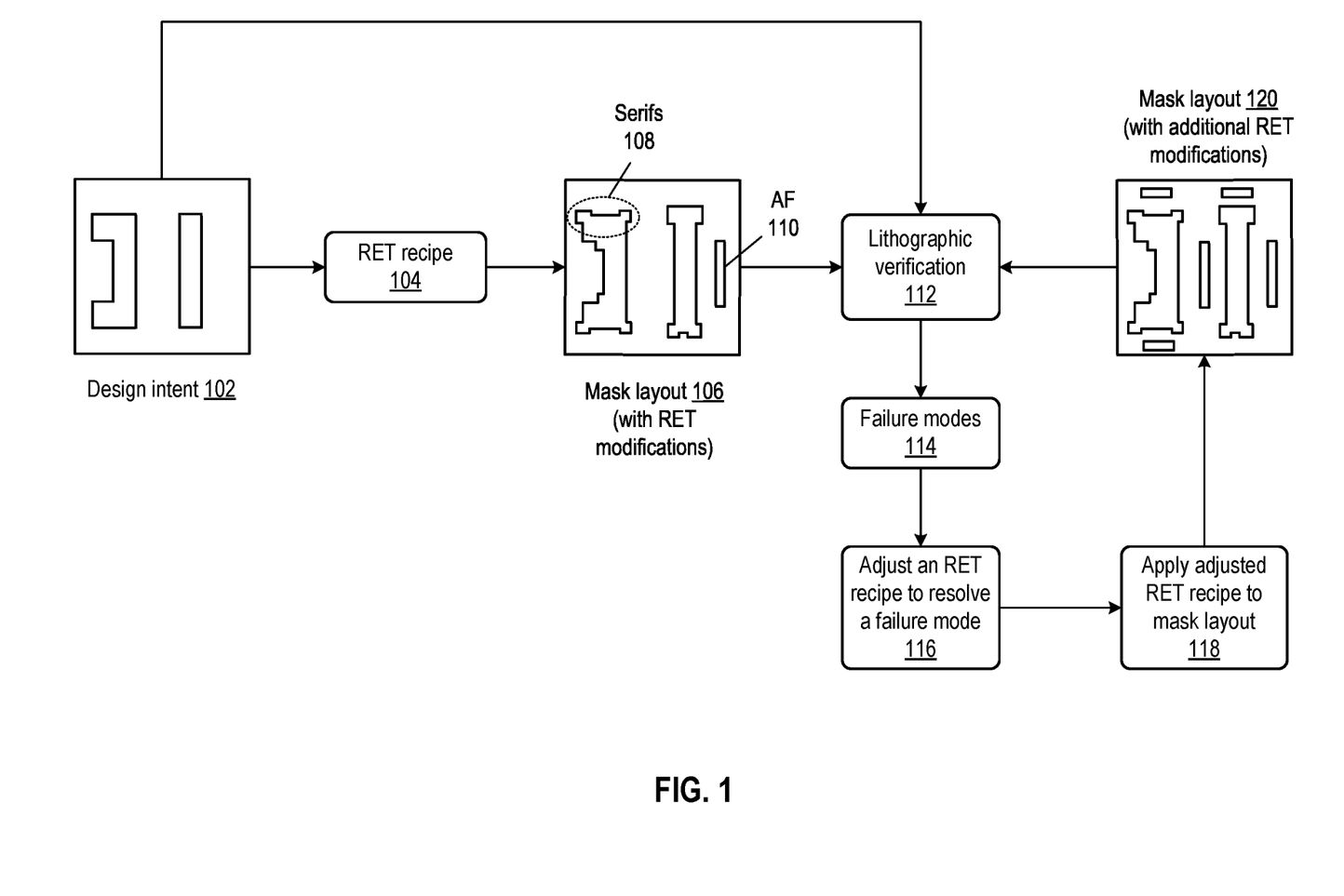
FIG. 1 illustrates a process for determining failure modes in design intents and RET recipes to resolve the failure modes in accordance with some embodiments described herein.

FIG. 1 illustrates a process for determining failure modes in design intents and RET recipes to resolve the failure modes in accordance with some embodiments described herein. Design intent 102 may include the shapes that are desired to be printed on the wafer. In FIG. 1, design intent 102 is shown with two polygons, but typically design intent 102 may have a large number of polygons (e.g., tens of millions of polygons). Design intent 102 may be a design of an actual IC chip. However, design intent 102 may also be a design that has been created for training the artificial neural network. Specifically, design intent 102 may include random placements of unit cells, and/or may include random and/or programmed patterns.

RET recipe 104 may be applied to design intent 102 to obtain mask layout 106 that may include one or more modifications, such as serifs 108 and assist features 110. In some embodiments, RET recipe 104 may be selected to produce a reasonable quality of results and have a reasonable runtime. Specifically, RET recipe 104 may consider nominal process conditions and may have a small number of adjustment iterations. At least some manufacturing problems may be expected to exist after RET recipe 104 is applied to design intent 102. Lithographic verification (step 112) can be performed to determine whether or not mask layout 106 is expected to print design intent 102 on the wafer with high fidelity. As a non-limiting example, a lithographic verification tool such as Synopsys's Proteus Lithography Rule Check (PLRC) may be used to perform lithographic verification.

Figure 2:
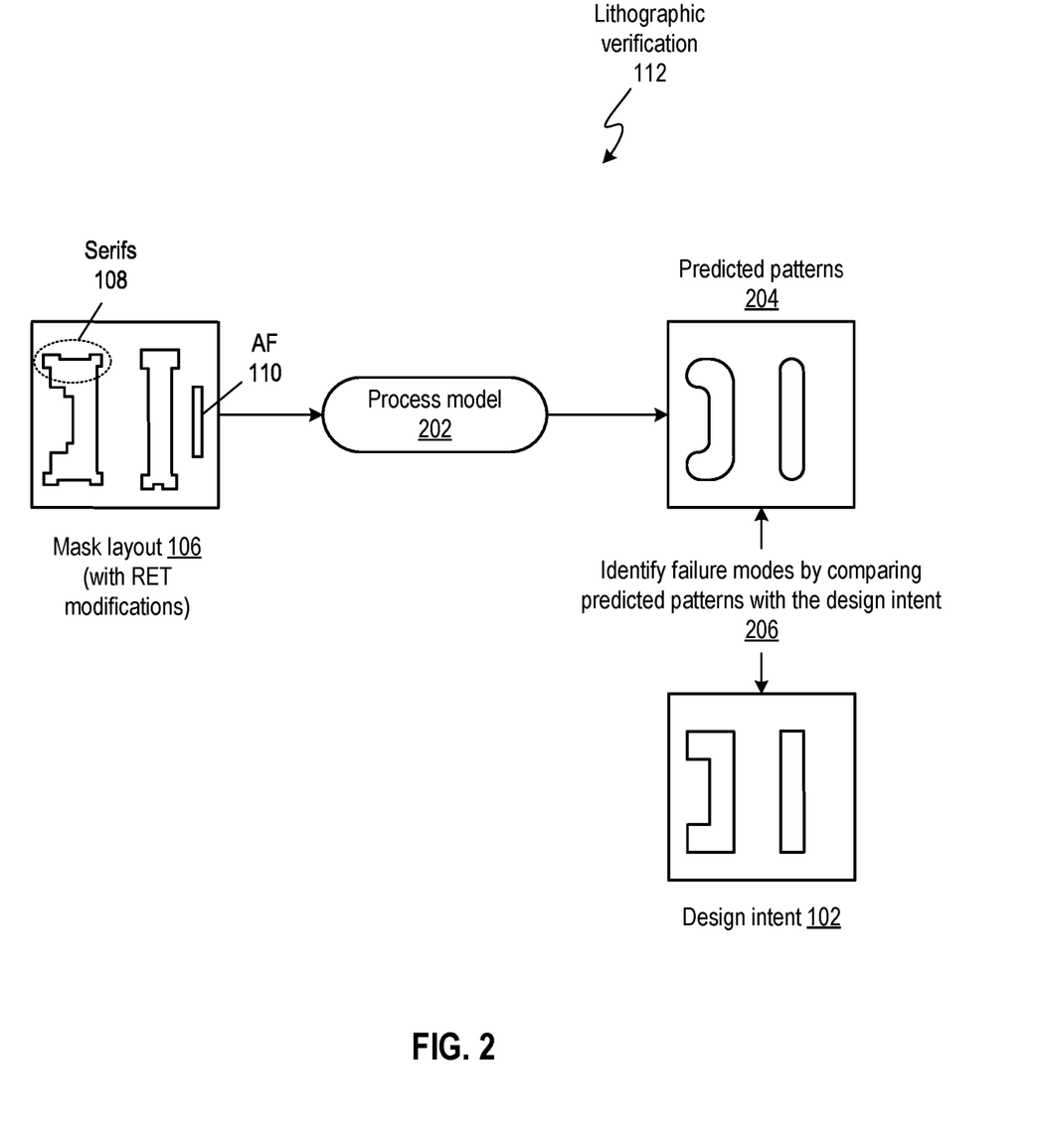
FIG. 2 illustrates a process for performing lithographic verification in accordance with some embodiments described herein.

FIG. 2 illustrates a process for performing lithographic verification in accordance with some embodiments described herein. Process model 202 may be developed to model a given semiconductor manufacturing technology, and may be used to simulate the effects of physical and/or chemical processes that occur during manufacturing. Given a mask layout, process model 202 may generate predicted patterns 204 that are expected to be printed on a wafer. The mask layout that is provided as input to process model 202 may or may not include RET modifications. For example, mask layout 106 includes RET modifications such as serifs 108 and assist feature 110, which may have been generated by applying one or more RETs to design intent 102. Process model 202 may produce predicted patterns 204 based on mask layout 106. Next, failure modes may be identified in step 206 by comparing predicted patterns 204 with design intent 102.

Referring to FIG. 1, lithographic verification (step 112) can generate failure modes 114, where each failure mode corresponds to one or more discrepancies between the design intent and the shapes that are expected to be printed on the wafer. Each discrepancy that is outside a tolerance limit may be identified as a failure. A common cause that causes a set of failures may be identified as a failure mode.

For each failure mode, the RET recipe may be adjusted to resolve the failure mode (step 116). In other words, the RET recipe may be adjusted so that the modifications made by the RET recipe fixes a specific type of discrepancy between the design intent and the shapes that are expected to be printed on the wafer. The adjusted RET recipe can then be applied to the current mask layout (step 118) to obtain mask layout 120, which becomes the current mask layout in the next iteration. Note that the adjusted RET recipe may be applied within an area around the discrepancies, and not throughout the entire mask layout. Also note that the mask layout that is provided as input to step 118 may include modifications that were made by previous rounds of RET treatments.

In some embodiments, the locations of the failure modes may be marked by placing polygons in proximity to the locations of the failure modes. Specifically, the polygon may be placed so that the failure mode is within the boundary of the polygon, and the polygon may include shapes that are within a process ambit of the failure mode location. In some embodiments, a polygon may be placed on a new layer which may not be part of the output mask, but which may be used to track locations where specific failure modes have been identified. When the RET recipe is adjusted, the areas within the polygons on the new layer may be used to determine if the adjustments resolve the failure mode.

In some embodiments, multiple new layers may be generated, which may allow classification of manufacturing problems into separate layers. For instance, lithographic verification might identify regions of poor process window as well as areas where nominal correction has not converged to an acceptable value. In this scenario, the RET recipe may be adjusted differently to handle these two types of failures. Specifically, for the areas that have a poor process window, the RET recipe may be adjusted by including additional terms in the optimization cost function to increase the process window. For the areas that have poor convergence, the RET recipe may be adjusted by increasing the number of optimization steps to meet nominal correction tolerance.

Figure 3:
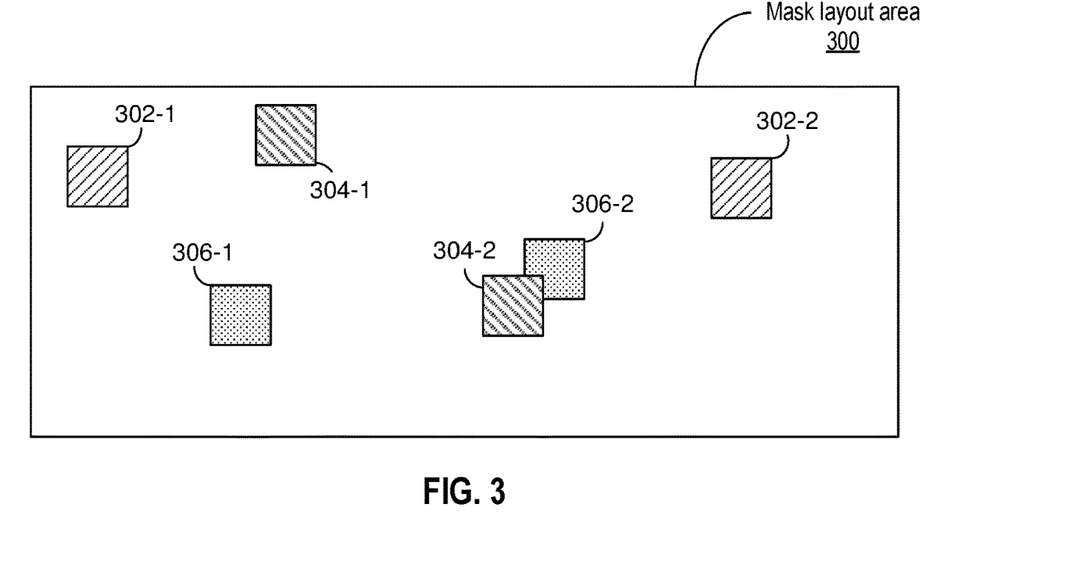
FIG. 3 illustrates how failure mode locations can be marked in an mask layout in accordance with some embodiments described herein.

FIG. 3 illustrates how failure mode locations can be marked in an mask layout in accordance with some embodiments described herein. The process illustrated in FIG. 1 can be used to identify failure modes in mask layout area 300. In FIG. 3, each shaded rectangle corresponds to a location of a manufacturing problem. A failure mode corresponds to a type of manufacturing problem. For example, manufacturing problem locations 302-1 and 302-2 correspond to the same failure mode. Likewise, manufacturing problem locations 304-1 and 304-2 correspond to the same failure mode which is different from the failure mode corresponding to manufacturing problem locations 302-1 and 302-2. Finally, manufacturing problem locations 306-1 and 306-2 correspond to a third failure mode which is different from the other two failure modes. Each failure mode may correspond to an RET recipe adjustment that is expected to resolve the manufacturing problem associated with the failure mode. Thus, an RET recipe adjustment may be developed that resolves manufacturing problems at locations 302-1 and 302-2. The polygons that are placed to mark two failure modes can overlap with each other, e.g., failure mode locations 304-2 and 306-2 overlap with each other (in the specific example shown in FIG. 3, polygons at locations 304-2 and 306-2 may be on different design layers, but generally the polygons on the same layer may also overlap with each other).

In some embodiments, each failure mode may be assigned a separate design layer, and the problem locations corresponding to each failure mode may be included in the respective design layer. Thus, if a first failure mode, which corresponds to manufacturing problems 302-1 and 302-2, is assigned a first design layer, then the first design layer may only include manufacturing problem locations 302-1 and 302-2. The other manufacturing problem locations shown in FIG. 3 (i.e., 304-1, 304-2, 306-1, and 306-2) may be included in their respective design layers. In these embodiments, the RET recipe adjustment corresponding to a given failure mode may be applied to all manufacturing problem locations specified in the design layer corresponding to the failure mode.

Referring to FIG. 1, the process may then perform lithographic verification (step 112) to determine whether or not mask layout 120 is expected to print design intent 102 on the wafer. If any failure modes remain unresolved or if new failure modes were created when the adjusted RET recipe was applied, then steps 114, 116, 118, 120, and 112 may be performed again.

Specifically, the loop comprising steps 112, 114, 116, 118, and 120 may be performed one or more times until all failure modes have been considered and have been resolved within predetermined tolerance levels. During each iteration of the loop, the manufacturability of the mask layout may improve as failures are fixed by the adjusted RET recipe. However, the locations of the failures are retained for artificial neural network training purposes. From one iteration to the next, new problem locations may be discovered. These new problems may be introduced as a side-effect of fixing previously identified problems. It is expected that the number of new problems will diminish rapidly in each iteration, and only a few iterations of the loop may be necessary to identify and fix all manufacturing problems in the mask layout.

As explained above, the process shown in FIG. 1 may identify failure modes 114 in design intent 102. Each failure mode may correspond to a type of manufacturing problem that is expected to occur at a specific location in the mask layout if the current version of the mask layout is used. For each failure mode that is identified by lithographic verification 112, the process shown in FIG. 1 may also generate a corresponding RET recipe adjustment that, when applied to area around the manufacturing problem location, partially or fully resolves the manufacturing problem associated with the failure mode.

Some non-limiting examples of RETs, failure modes, and RET recipes that can resolve the failure modes are now described. Rule-based RETs may use a set of rules to determine the modifications that are to be made. Upon detecting a particular pattern in the mask layout, a rule-based RET may apply a specific modification to the pattern. For example, a rule-based RET may identify a set of line-end patterns in the mask layout, and add a hammerhead serif to each line-end pattern to reduce or prevent manufacturing problems caused by line-end shortening, or corner rounding, or both. Different tradeoff points between the amount of computational resources used and the quality of results produced may exist based on the complexity and the number of rules that are used. Specifically, a large number of complex rules may produce a relatively higher quality of results, but may use a large amount of computational resources. Conversely, a few number of simple rules may produce a relatively lower quality of results, but may use a small amount of computational resources.

Process model based RETs use a process model to predict the shapes that are expected to be printed, and iteratively perform perturbations on the mask layout to correct any discrepancies between the predicted pattern and the design intent. Process model based RETs are sometimes referred to as optical proximity correction (OPC). Process model based RETs can also place assist features to resolve manufacturing problems, e.g., those caused by low process window or low depth of focus. Different tradeoff points between the amount of computational resources used and the quality of results produced may exist based on the accuracy of the process model and the number of iterations. Specifically, using a highly accurate process model and using a large number of iterations may produce a relatively higher quality of results, but may use a large amount of computational resources. Conversely, using a fast process model that is not very accurate and using a small number of iterations may produce a relatively lower quality of results, but may use a small amount of computational resources.

Inverse imaging based RETs are based on inverting the process model. For example, the printing a mask layout can be represented as:

$$z(x,y)=T\{m(x,y)\},$$

where $T\{.\}$ is the process model (e.g., the Hopkins imaging model if we are modeling the imaging process), $m(x, y)$ is the input mask layout, and $z(x, y)$ is the printed pattern. Let $z^*(x, y)$ be the design intent. The goal of the inverse imaging problem is to estimate the mask layout $m(x, y)$ such that the resulting printed pattern $T\{m(x, y)\}$ resembles the design intent $z^*(x, y)$. Specifically, the resemblance of the printed pattern with the design intent can be measured using a distance metric between the two patterns.

Some embodiments may formulate the inverse-imaging problem as an optimization problem with a cost function that indicates a difference between the design intent and the printed pattern. Specifically, in some embodiments, the cost function, $f$, may be:

$$f(m(x,y))=\|z^*(x,y)-T\{m(x,y)\}\|^2_2. \tag{1}$$

The objective is to estimate the mask layout m(x, y), which minimizes the $L_2$ norm of the distance between the printed pattern and the design intent. Depending on the desired goal, the cost function in Equation (1) can also be augmented to include more objectives like image log-slope maximization, assist feature printability compliance, optical proximity correction for contour fidelity, focus sensitivity minimization for better process window, etc. In other words, embodiments described herein are not limited to using the cost function shown in Equation (1). Some embodiments may use a pixel-based parameterization to solve the inverse-imaging problem. The cost function shown in Equation (1) can be optimized using standard optimization techniques like gradient descent, conjugate gradient, quasi-Newton, etc.

Different tradeoff points between the amount of computational resources used and the quality of results produced may exist based on the cost function used and/or the number of iterations used during optimization. Specifically, using a complicated cost function with multiple non-linear terms and a large number of optimization iterations may produce a higher quality of results, but may use a large amount of computational resources. Conversely, using a relatively simple cost function and a small number of optimization iterations may produce a low quality of results, but may use a small amount of computational resources.

A failure mode may occur when the difference between the width (i.e., the critical dimension) of a printed line and the width of the line in the design intent is greater than a tolerance threshold. An RET recipe may change the width of the line in the design intent so that the width of the printed line is substantially equal to the width of the line in the design intent (e.g., a rule-based RET may increase the width of the line in the design intent).

Another failure mode may occur when excessive shortening occurs at a line-end. An RET recipe may add one or more serifs to the line-end to resolve this manufacturing problem (e.g., a process model based RET recipe may iteratively perturb the line-end; alternatively, an inverse imaging based RET may determine a line-end shape that includes modifications to resolve the manufacturing problem).

Yet another failure mode may occur when a pattern has a low process window and/or low depth of focus, e.g., the pattern may print satisfactorily at nominal focus conditions, but may exhibit serious manufacturing problems (e.g., line-end shortening) when the lithography imaging system is slightly out of focus. An RET recipe may add one or more assist features in proximity to the pattern to increase the depth of focus (e.g., a process model based RET recipe may iteratively try different assist feature configurations to increase the depth of focus; alternatively, an inverse imaging based RET recipe that includes a depth of focus term in the cost function may place one or more assist features to increase the depth of focus).

Figure 4:
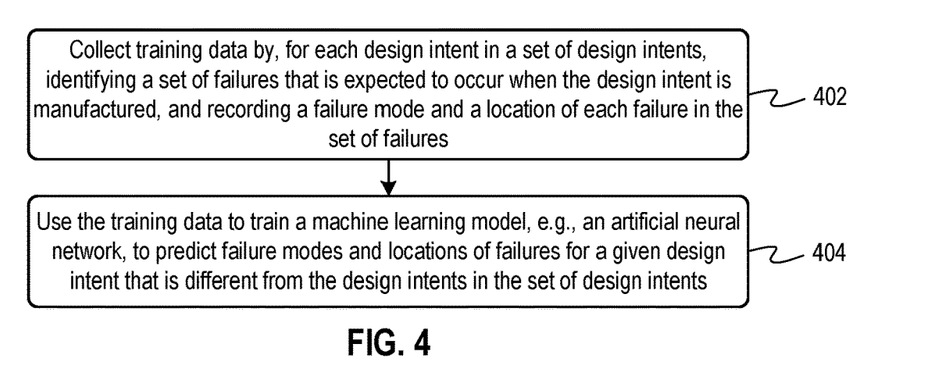
FIG. 4 illustrates a process for training an artificial neural network to predict failure modes in accordance with some embodiments described herein.

FIG. 4 illustrates a process for training an artificial neural network to predict failure modes in accordance with some embodiments described herein. The process may begin by collecting training data by, for each design intent in a set of design intents, identifying a set of failures that is expected to occur when the design intent is manufactured, and recording a failure mode and a location of each failure in the set of failures (step 402). For example, the failure modes can be determined by using the process illustrated in FIG. 1.

Next, the process may use the training data to train a machine learning model, e.g., an artificial neural network, to predict failure modes and locations of failures for a given design intent that is different from the design intents in the set of design intents (step 404). The input to the artificial neural network can be the design intent, i.e., the shapes that are desired to be printed on the wafer without any RET modifications.

The artificial neural network can be trained using supervised learning, in which the design intent (without any RET modifications) may be provided as input to the artificial neural network, and the set of failure modes and their locations (that were determined by using, e.g., the process illustrated in FIG. 1) may be provided as the desired outputs.

In some embodiments, the artificial neural network may include an input layer, an output layer, and one or more hidden layers. The design intent may be rasterized, i.e., converted into a two dimensional pixel map. Each pixel may correspond to a node in the input layer. The value of a pixel may be a floating point number between 0 and 1, where 0 may correspond to a clear area, 1 may correspond to an opaque area, and a number between 0 and 1 may correspond to percentage of clear/opaque area within the pixel. The output layer may include a set of nodes, where each node may correspond to a particular combination of a location and a failure mode. During supervised learning, the input layer nodes may be assigned values based on a rasterized representation of a design intent, and the output layer nodes may be assigned values based on the locations and failure modes of the expected manufacturing problems. A back propagation technique may then be used to adjust connection weights in the artificial neural network. After the artificial neural network has been trained, the artificial neural network may be used for selectively applying RET recipes to a design intent.

Figure 5:
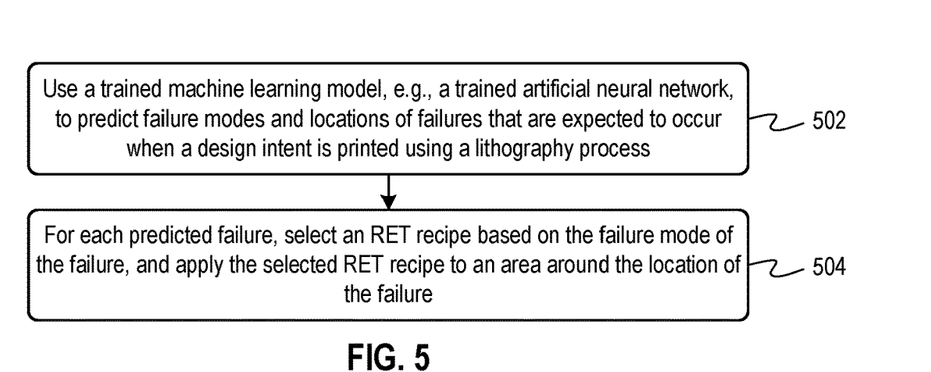
FIG. 5 illustrates a process for using an artificial neural network to selectively apply RET recipes to an mask layout in accordance with some embodiments described herein.

FIG. 5 illustrates a process for using an artificial neural network to selectively apply RET recipes to an mask layout in accordance with some embodiments described herein. The process may begin by using a trained machine learning model, e.g., a trained artificial neural network, to predict failure modes and locations of failures that are expected to occur when a design intent is printed using a lithography process (step 502). Next, for each predicted failure, the process may select an RET recipe based on the failure mode of the failure, and apply the selected RET recipe to an area around the location of the failure (step 504).

Figure 6:
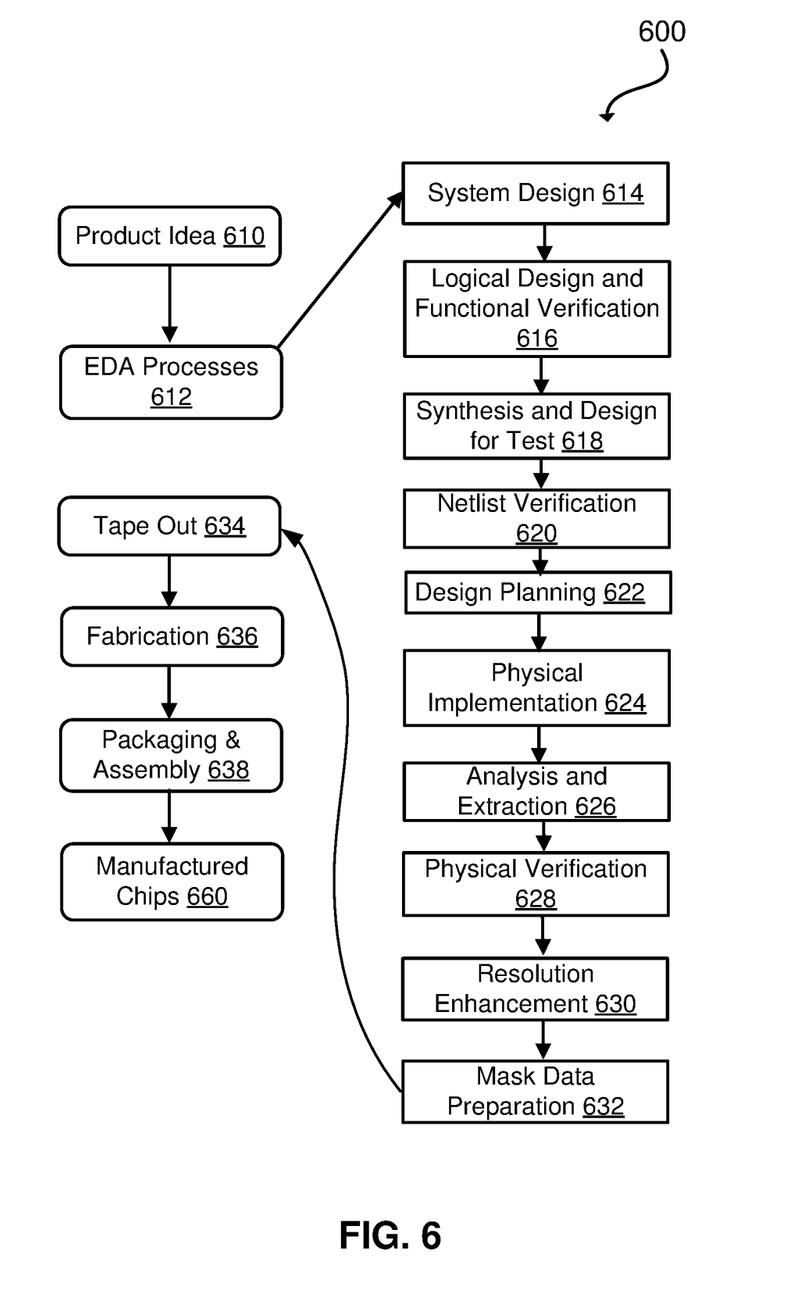
FIG. 6 depicts a flowchart that illustrates an IC design and manufacture flow in accordance with some embodiments described herein.

FIG. 6 illustrates an example flow 600 for the design, verification, and fabrication of an integrated circuit in accordance with some embodiments described herein. EDA processes 612 (the acronym "EDA" refers to "Electronic Design Automation") can be used to transform and verify design data and instructions that represent the integrated circuit. Each of these processes can be structured and enabled as multiple modules or operations.

Flow 600 can start with the creation of a product idea 610 with information supplied by a designer, information which is transformed and verified by using EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly 638 are performed to produce the manufactured IC chip 640.

Specifications for a circuit or electronic structure may range from low-level transistor material layouts to high-level description languages. A high-level of abstraction may be used to design circuits and systems, using a hardware description language ("HDL") such as VHDL, Verilog, SystemVerilog, SystemC, MyHDL or OpenVera. The HDL description can be transformed to a logic-level register transfer level ("RTL") description, a gate-level description, a layout-level description, or a mask-level description. Each lower abstraction level that is a less abstract description adds more detail into the design description. The lower levels of abstraction that are less abstract descriptions can be generated by a computer, derived from a design library, or created by another design automation process. An example of a specification language at a lower level of abstraction language for specifying more detailed descriptions is SPICE (which stands for "Simulation Program with Integrated Circuit Emphasis"). Descriptions at each level of abstraction contain details that are sufficient for use by the corresponding tools of that layer (e.g., a formal verification tool).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as test-bench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 in FIG. 7) may be used to store the programs and data structures that are used by some or all of the EDA products described herein, and products used for development of cells for the library and for physical and logical design that use the library.

Figure 7:
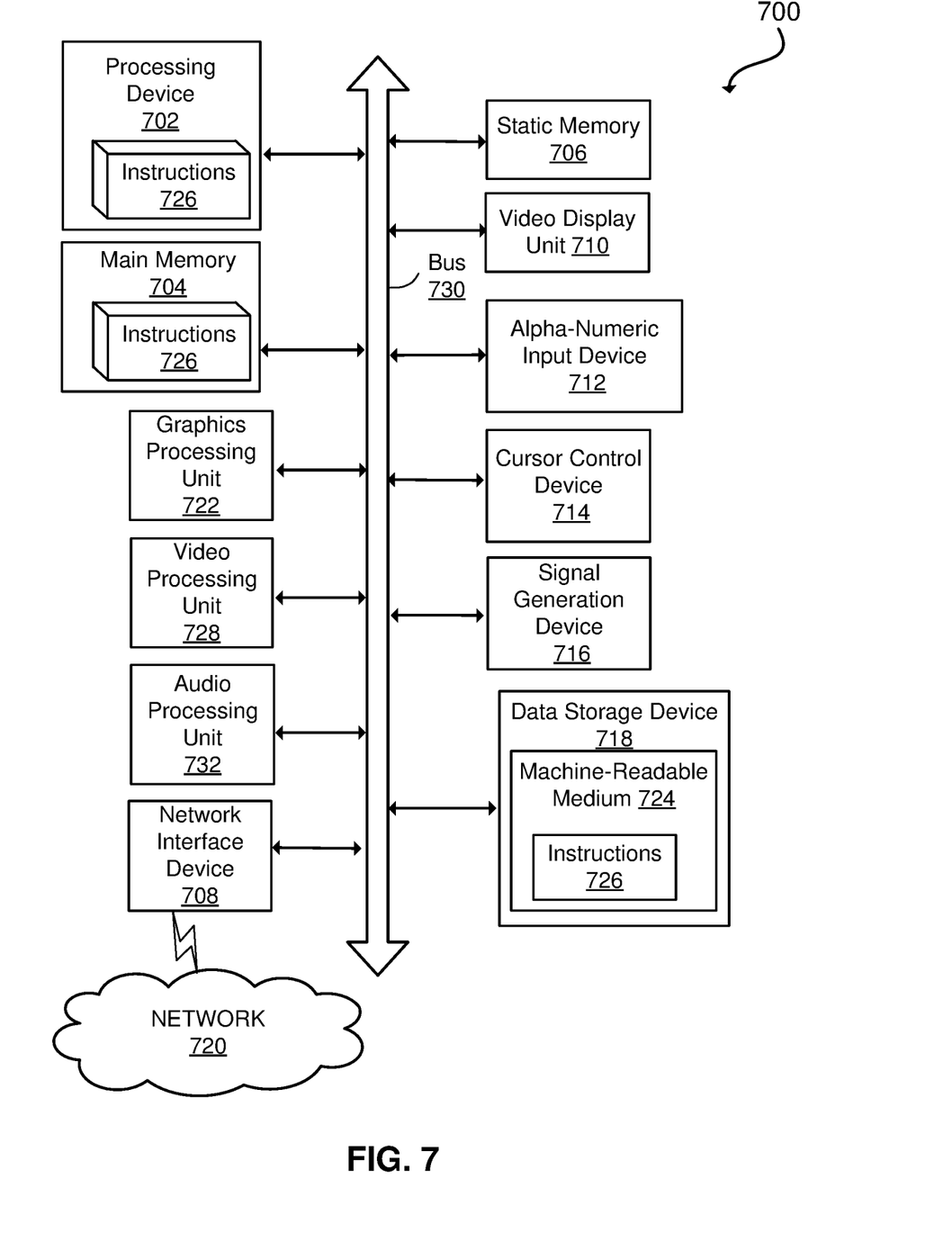
FIG. 7 illustrates an example machine of a computer system within which a set of instructions, for causing the machine to perform any one or more of the methodologies discussed herein, may be executed in accordance with some embodiments described herein.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    collecting training data for each design intent in a set of design intents by:
        identifying a set of failures that is expected to occur when the design intent is manufactured, and
        recording a failure mode and a location of each failure in the set of failures; and
    using the training data to train, by a processor, a neural network to predict failure modes and locations of failures for a first design intent that is different from the design intents in the set of design intents.

2. The method of claim 1, wherein the first design intent specifies shapes that are desired to be printed on a wafer.

3. The method of claim 1, wherein said using the training data to train the neural network comprises using supervised learning, wherein a design intent is provided as input and failure modes and locations are provided as a desired output.

4. The method of claim 1, wherein said collecting training data comprises:
    identifying a failure mode in a mask layout using lithographic verification;
    adjusting a reticle enhancement technique (RET) recipe to resolve occurrences of the failure mode; and
    applying the adjusted RET recipe to the mask layout.

5. The method of claim 4, wherein a separate design layer is created for each failure mode to mark locations of failures belonging to the failure mode.

6. The method of claim 5, wherein each location of a failure is marked by placing a polygon in the design layer in proximity to the location of the failure.

7. The method of claim 6, wherein said applying the adjusted RET recipe to the mask layout comprises applying the adjusted RET recipe to areas within polygons in the design layer corresponding to the failure mode.

8. The method of claim 1, comprising:
using the trained neural network to identify failure modes and locations of failures expected to occur in a design intent; and
for each failure, selecting an RET recipe based on the failure mode of the failure, and applying the selected RET recipe to an area around the location of the failure.

9. A non-transitory storage medium storing instructions, which when executed by a processor, cause the processor to:
use a trained neural network to predict failure modes and locations of failures that are expected to occur when a design intent is printed using a lithography process; and
for each failure,
select a reticle enhancement technique (RET) recipe based on the failure mode of the failure, and
apply the selected RET recipe to an area around the location of the failure.

10. The non-transitory storage medium of claim 9, comprising instructions, which when executed by the processor, cause the processor to:
collect training data, wherein the training data comprises a failure mode and a location of each failure in a set of failures that is identified using a lithographic verification tool; and
use the training data to train an untrained neural network to predict failure modes and locations of failures for a given design intent.

11. The non-transitory storage medium of claim 10, wherein said collecting the training data comprises:
identifying a failure mode in a mask layout using the lithographic verification tool;
adjusting a reticle enhancement technique (RET) recipe to resolve occurrences of the failure mode; and
applying the adjusted RET recipe to the mask layout.

12. The non-transitory storage medium of claim 11, wherein a separate design layer is created for each failure mode to mark locations of failures belonging to the failure mode.

13. The non-transitory storage medium of claim 12, wherein each location of a failure is marked by placing a polygon in the design layer in proximity to the location of the failure.

14. The non-transitory storage medium of claim 13, wherein said applying the adjusted RET recipe to the mask layout comprises applying the adjusted RET recipe to areas within polygons in the design layer corresponding to the failure mode.

15. An apparatus, comprising:
a memory storing instructions; and
a processor, coupled with the memory and to execute the instructions, the instructions when executed causing the processor to:
collect training data, wherein the training data comprises failure modes and locations of failures identified using a lithographic verification tool;
obtain a trained machine learning model by training an untrained machine learning model using the training data;
use the trained machine learning model to predict failure modes and locations of failures expected to occur in a design intent; and
for each predicted failure,
select a reticle enhancement technique (RET) recipe based on the failure mode of the failure, and
apply the selected RET recipe to an area around the location of the failure.

16. The apparatus of claim 15, wherein said collecting the training data comprises:
identifying a failure mode in a mask layout using the lithographic verification tool;
adjusting a reticle enhancement technique (RET) recipe to resolve occurrences of the failure mode; and
applying the adjusted RET recipe to the mask layout.

17. The apparatus of claim 16, wherein said training the untrained machine learning model comprises using supervised learning, wherein a design intent is provided as input and failure modes and locations of failures are provided as a desired output.

18. The apparatus of claim 16, wherein a separate design layer is created for each failure mode to mark locations of failures belonging to the failure mode.

19. The apparatus of claim 18, wherein each location of a failure is marked by placing a polygon in the design layer in proximity to the location of the failure.

20. The apparatus of claim 19, wherein said applying the adjusted RET recipe to the mask layout comprises applying the adjusted RET recipe to areas within polygons in the design layer corresponding to the failure mode.

* * * * *